United States Patent [19]

Knepper

[11] 3,896,560
[45] July 29, 1975

[54] TWO-STAGE FLUIDIZED BED REACTOR WITH NOZZLE TUYERES

[75] Inventor: William A. Knepper, Franklin Twp., Pa.

[73] Assignee: United States Steel Corporation, Pittsburgh, Pa.

[22] Filed: June 18, 1973

[21] Appl. No.: 371,107

[52] U.S. Cl. .................. 34/57 R; 432/58; 23/288 S; 239/518; 34/57 A
[51] Int. Cl. ............................................. F26b 17/10
[58] Field of Search .............. 23/288 S; 432/15, 58; 34/10, 57 R, 57 A; 239/518, 521

[56] References Cited
UNITED STATES PATENTS

| | | | |
|---|---|---|---|
| 2,607,662 | 8/1952 | Huff | 34/57 A |
| 3,141,000 | 7/1964 | Turner | 239/518 X |
| 3,197,286 | 7/1965 | Farkas et al. | 23/288 S |
| 3,298,793 | 1/1967 | Mallison et al. | 34/57 A X |
| 3,511,616 | 5/1970 | Steever | 34/57 R X |
| 3,552,033 | 1/1971 | Steever et al. | 34/57 A |
| 3,633,887 | 1/1972 | Bechthold et al. | 432/15 |
| 3,672,648 | 6/1972 | Price | 34/57 A |

FOREIGN PATENTS OR APPLICATIONS

| | | | |
|---|---|---|---|
| 1,058,817 | 3/1954 | France | 34/57 A |

*Primary Examiner*—Charles J. Myhre
*Assistant Examiner*—William C. Anderson
*Attorney, Agent, or Firm*—William L. Krayer

[57] ABSTRACT

A two-stage fluidized bed reactor for the reduction of iron ore fines is improved by the use of novel tuyeres in the floor of the bed of the upper reactor. The novel tuyere includes a vertical orifice for providing a pressure drop for gas distribution, a segment of passageway of increased diameter in order to reduce the velocity of the gases from 400 to 500 feet per second to less than 100 feet per second in a very short distance; in addition, a horizontal cap plate is employed to prevent sifting of fines downward through the tuyere.

4 Claims, 2 Drawing Figures

FIG. 1
FIG. 2
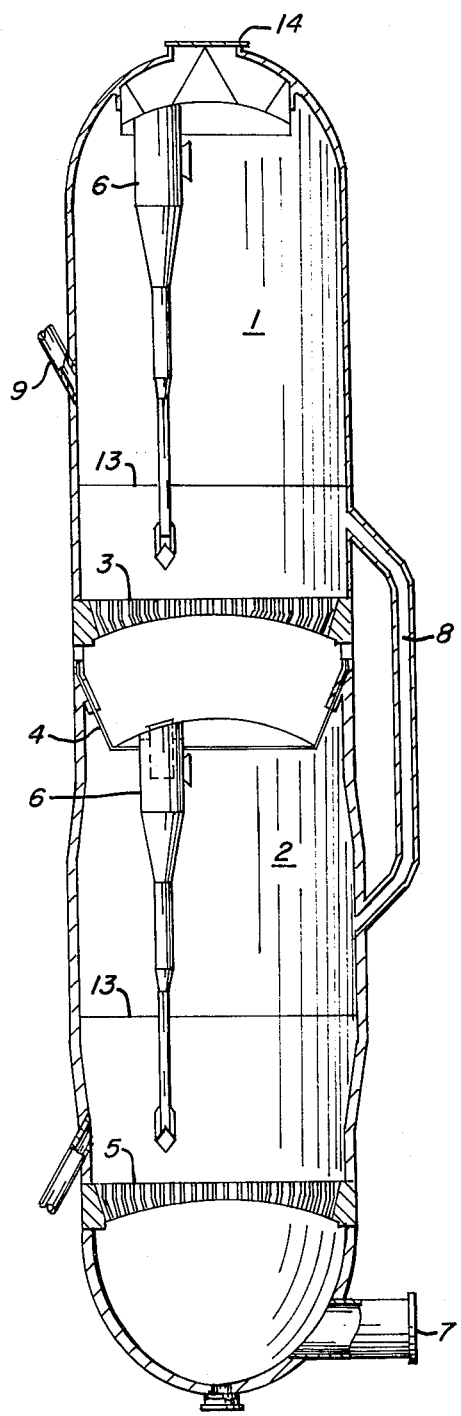
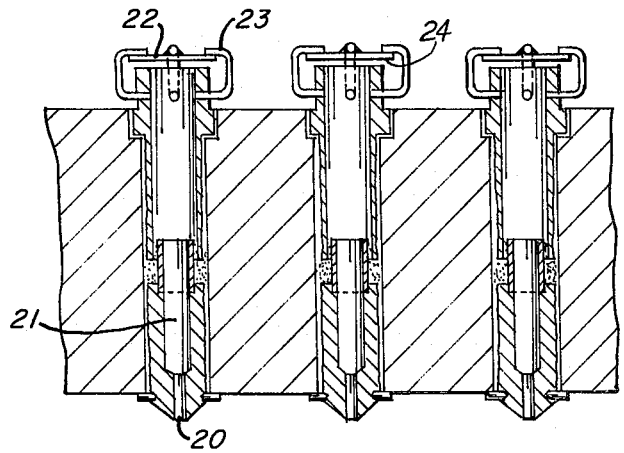

TWO-STAGE FLUIDIZED BED REACTOR WITH NOZZLE TUYERES

BACKGROUND OF THE INVENTION

This invention is an improvement on a two-stage fluidized bed reactor comprising a lower reducing chamber, a horizontal divider floor on top of the reducing chamber, and a second stage reducing chamber above the divider floor. In such conventional fluidized bed reactors, the floor dividing the first and second stage chamber is provided with a plurality of tuyeres whose purpose is to permit the passage and distribution of hot reducing gases from one chamber into the other vertically. Tuyeres of the conventional construction have been notoriously difficult to keep clear of solid deposits which tend to block the openings in the tuyeres thus preventing the passage of gas from one chamber to another. In addition, while the upper stage is normally maintained in a state of fluidization, that is, in a state of suspension, there is nevertheless a tendency for the solid particulate matter in the upper stage to fall back into the tuyeres or valves and form blockages or solid deposits in their passages. Perhaps more important, dust particles from the bottom stage not removed by the cyclones may be carried by the gas through the tuyeres and form hard, highly adherent deposits throughout and around the tuyeres. Prior to the present invention, it has been extremely difficult to prevent the blockages described and the resulting down time required to repair the tuyeres.

For a general background in tuyere assemblies and fluidized beds, the reader may be interested in reviewing U.S. Pat. Nos. 3,466,021, 3,508,341, and 3,672,648. My invention is not limited to the particular configurations shown in those three patents; rather, it is applicable for use in any two-stage fluidized bed reactor, and is particularly adaptable for use in a vertical two-stage reactor wherein hot gas and particulate matter pass from a lower first-stage chamber through tuyeres in the roof thereof into a second fluidized bed chamber in the top of the reactor.

SUMMARY OF THE INVENTION

My invention provides for a new tuyere construction comprising at its entry a restricted opening; in the next downstream portion (assuming a vertical draft, the downstream portion will be over the restricted opening) a segment of larger diameter to induce a reduction of velocity, and mounted on top of the tuyere, that is, at the furthest downstream point of flow, a horizontal cap protruding over the sides of the opening to a point beyond the angle of repose of the fines to be used. My invention also comprises a two-bed reactor employing a plurality of such tuyeres in between the beds and/or at the bottom of the lower one to provide a passage for the gas. My invention will be further described with reference to the accompanying drawings, of which:

FIG. 1 is a side sectional view of a two-stage fluidized bed reactor employing my tuyeres, and FIG. 2 is a side sectional view of a plurality of tuyeres showing the detail of their construction.

In FIG. 1, the two-stage fluidized bed reactor is seen to comprise chambers 1 and 2, an upper reducer dome 3 including a plurality of tuyeres, a lower plenum chamber 4, a lower reducer dome 5, a plurality of cyclones 6 in each chamber, means 9 for introducing hot ore or other material into upper chamber 1, means 7 for introducing reducing gas into the lower chamber 2, and means 8 for providing a counter current flow of ore and/or partially reduced material.

The device shown in FIG. 1 operates as follows. The hot ore is introduced through means 9 into chamber 1 where it is maintained in a fluidized state by the flow of hot gas through the upper reducer dome and the tuyeres therein; the partially reduced ore is conducted through means 8 around the plenum into chamber 2 where it is further reduced by the newly introduced hot reducing gas entering through inlet 7. Tuyeres in the lower reducer dome distribute the new reducing gas and maintain the partially reduced ore 13 in a fluidized state in chamber No. 2.

The cyclones 6 in each chamber remove most of the entrained ore particles and return these particles to the originating fluidized bed. At the top of chamber 1 is an off gas outlet 14 which may be discharged to the atmosphere or cleaned in a gas scrubbing device for subsequent use as a fuel. Near the bottom of the lower chamber is a pipe for removing the reduced ore.

Referring now to FIG. 2, a section of the upper reducer dome is shown cut through several of the normal tuyeres of my invention. The normal tuyere contains a lower restricted orifice 20, an expanded segment 21 thereabove, and a cap 22 which extends a significant distance over the opening, held in place by braces 23. A two-chamber fluidized bed reactor will normally have more than a hundred tuyeres.

The opening 24 between cap 22 and the top of the tuyere is protected from intruding fines and the like by a projection of the cap 22 to a point which may vary with the material treated, but which should be at least on the angle of repose of the material taken from the top or opening of the tuyere under the cap. The opening between the cap and the terminus of the expanded segment should not create a restriction; that is, the cylindrical opening defined by the space between the circular terminus and the planar cap should have an area no less than that of the circular terminal opening of the expanded segment.

The connecting or expanded segment 21 should have an internal diameter at least 2 times the orifice diameter and should be at least 20 times as long as the orifice diameter.

Assuming an initial velocity of gas through orifice 20 of from 400 to 500 feet per second, the velocity will be reduced in the expanded segment 21 to less than 100 feet per second, i.e. from 50 to 100 feet per second.

My invention is not limited to the above specific variations and illustrations. It may be otherwise practiced within the scope of the following claims.

I claim:

1. A tuyere for use in conveying hot reducing gas through the floor of a fluidized bed reaction chamber comprising a generally tubular member defining a lower restricted vertical orifice, a connecting segment having an internal diameter at least 2 times the orifice diameter and at least 20 times as long as the orifice diameter, a terminal opening having a cross sectional area at least the area of the connecting segment, and a horizontal cap perpendicular to said terminal opening which, together with the terminus of said connecting segment, defines a cylindrical orifice having a cylindrical area no less than that of said terminal opening, said cap protruding around said terminal opening and beyond to at least a point on the angle of repose of the material to be treated, taken from the terminal opening, whereby gas entering said lower restricted vertical orifice at a velocity of from 400 to 500 feet per second is reduced in velocity to from 50 to 100 feet per second and exits transversely through said cylindrical orifice.

2. A fluidized bed reactor containing a plurality of the tuyeres of claim 1.

3. A fluidized bed reactor useful in reducing ores with hot reducing gases comprising at least one reducing chamber, a floor therefor, a plurality of tuyeres of claim 1, and means for introducing hot reducing gas through the tuyeres into the reducing chamber.

4. A fluidized bed reactor useful for reducing ores and the like comprising at least two vertically oriented reducing chambers, a plenum between said chambers including a plurality of tuyeres of claim 1, means for creating a counter current flow of solids from the upper reducing chamber to the lower reducing chamber, and means for introducing hot reducing gas into said lower chamber under pressure sufficient to cause flow of gas through said tuyeres at a velocity from 50–100 feet per second at the terminus thereof.

* * * * *